United States Patent [19]
Johnson et al.

[11] Patent Number: 4,924,093
[45] Date of Patent: May 8, 1990

[54] BETA COUNTING MEANS AND APPARATUS

[75] Inventors: Edgar G. Johnson, Huntsville; James J. Cornelison, Gurley, both of Ala.

[73] Assignee: ICN Micromedic Systems, Inc., Costa Mesa, Calif.

[21] Appl. No.: 725,582

[22] Filed: Apr. 22, 1985

[51] Int. Cl.$^5$ ................................................ G01T 1/00
[52] U.S. Cl. .................................. 250/328; 250/308; 250/359.1
[58] Field of Search ....................... 250/308, 328, 359.1

[56] References Cited

U.S. PATENT DOCUMENTS

| 4,035,642 | 7/1977 | Johnson, Jr. et al. | 250/328 |
| 4,454,939 | 6/1984 | Kampf et al. | 250/328 |

FOREIGN PATENT DOCUMENTS

| 2307265 | 11/1976 | France | 250/328 |
| 47-9639 | 3/1972 | Japan | 250/328 |

OTHER PUBLICATIONS

Zanders et al., "A Simple Automatic Sample Changer for the Gamma-Ray Counting of Reactor-Irradiated Samples", pp. 973-975, J. Phys. E (GB), vol. 6, (Oct. 1973), No. 10.

Primary Examiner—Janice A. Howell
Assistant Examiner—David P. Porta
Attorney, Agent, or Firm—Lyon & Lyon

[57] ABSTRACT

An improved beta activity counter is disclosed which provides for counting plural, preferably even numbers of, samples simultaneously, while allowing automated handling of sample vial racks which are different widths are multiples of the number of simultaneous testing cells. The number of indexing steps needed per rack are adjusted automatically according to the number of vials that each rack will hold. Quench counting of adjacent samples simultaneously via use of one external source is also provided.

6 Claims, 7 Drawing Sheets

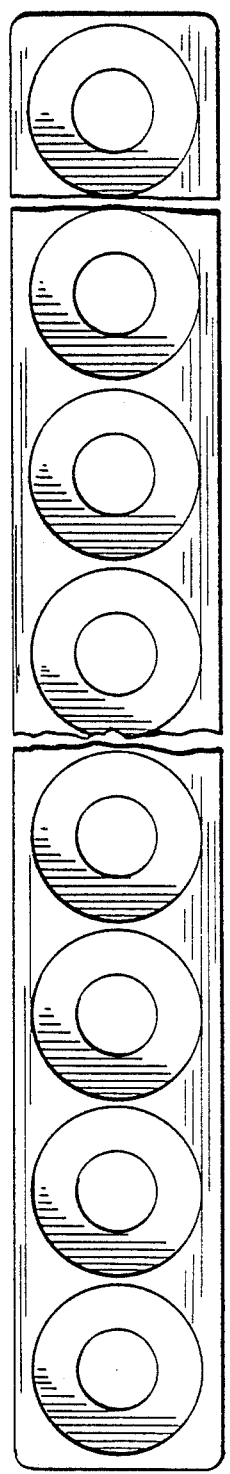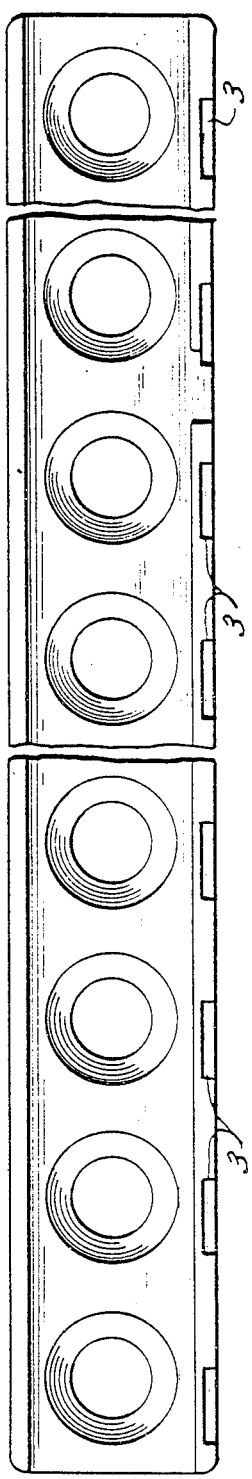

BETA COUNTING MEANS AND APPARATUS

CROSS REFERENCES TO THE PRIOR ART

U.S. Pat. No. 3,499,149—Cavanaugh, Jr., EXTERNAL STANDARDIZATION IN LIQUID SCINTILLATION SPECTROMETRY MAKING USE OF MULTIPLE EXTERNAL STANDARDS TO INSURE VOLUME INDEPENDENCE, Mar. 3, 1970.

U.S. Pat No. 3,515,876—Smith, et al., METHOD AND APPARATUS FOR POSITIONING A RADIOACTIVE STANDARD IN A RADIOACTIVE SAMPLE COUNTING APPARATUS, June 2, 1970.

U.S. Pat No. 3,852,599, Smith, VIAL TRANSFER MECHANISM, Dec.3, 1974.

U.S. Pat No. 3,859,528—Luitwieler, Jr., et al., GAMMA RAY APPARATUS WITH SAMPLE CHANGER, Jan. 7, 1975.

U.S. Pat No. 3,898,457—Packard, et al., METHODS AND APPARATUS FOR HANDLING FLEXIBLE LIQUID SAMPLE CONTAINERS FOR SCINTILLATION SPECTROMETRY, Aug. 5, 1975.

U.S. Pat No. 3,898,460—Noakes, et al., PROCESS AND APPARATUS FOR CONVERTING LIQUID BETA RADIATION SCINTILLATION COUNTER TO GAMMA RADIATION COUNTER, Aug. 5, 1975.

U.S. Pat No. 3,898,463—Noakes, SCINTILLATION COUNTING APPARATUS, Aug. 5, 1975.

U.S. Pat No. 4,035,642—Johnson, Jr., et al., GAMMA COUNTER APPARATUS, July 12, 1977.

BACKGROUND AND SUMMARY OF THE INVENTION

This invention relates to a beta activity automated scintillation counting method and apparatus including a sample transfer mechanism for transferring vials of radioactive material to a scintillation counting chamber which detects and measures light scintillations produced by radioactive decay. The invention will accordingly be described in relation to this specific type measurement.

Beta radiation is commonly measured with a liquid scintillation counter, such as a conventional beta-ray spectrometer, having a small chamber which receives a small glass vial between opposing photomultiplier tubes. The vial contains, for example, 10 to 20 cubic centimeters of a scintillation solution comprising a primary and/or secondary fluor dissolved in a suitable solvent, such as toluene or xylene. Hundreds of such liquid scintillation vials containing samples to be assayed are automatically fed one at a time to the photomultiplier tubes and the results are recorded by suitable instruments, often with an output of punched tapes in conjunction with a teletypewriter or other type of display/recording equipment.

One area in which scintillation counting is of great significance is radioimmunoassay. Radioimmunoassay is an analytical technique which depends upon the competition between labeled and unlabeled antigen for antigen-binding sites on antibody molecules. In practice, standard curves are constructed from work on a plurality of samples, each containing (a) the same known concentration of antigen labeled with a radioactive isotope tracer, and (b) various, but known, concentrations of unlabeled antigen. The mixture is incubated in contact with an antibody, the free antigen is separated from the antibody and antigen bound thereto, and then, by use of a suitable detector such as a beta radiation detector, the percent of either the bound or free labeled antigen is determined. This procedure is repeated for a number of samples containing various known concentrations of unlabeled antigens and the results plotted. The percent of bound tracer antigens is plotted as a function of the antigen concentration. Typically, as the total antigen concentration increases, the relative amount of the tracer antigen bound to the antibody decreases. After the standard graph is prepared, it is used to determine the concentration of antigen in samples undergoing analysis.

In actual analysis, the sample in which the concentration of antigen is to be determined is treated in a like manner. Then, from the standard curve, the concentration of antigen in the original sample is determined. Afterwards, the antibody or immunoadsorbent mass is discarded.

Under laboratory conditions, many samples may be involved and they are arranged for counting in a very precise order. It is desirable that the beta activity of the samples be counted and registered as rapidly and accurately as possible. Likewise, it is desirable that the beta apparatus be no larger than is absolutely necessary. The present invention provides just such a beta counter apparatus, in that it can form part of an automated device in which it is capable of continuous, automated throughput of large numbers of samples in a relatively small space, with a direct sequential readout of the scintillation counting results.

The invention provides multiple liquid scintillation counting stations within a single device for parallel counting of beta activity in plural samples.

In beta activity counting, the beta particle emitted from radioactive decay interacts generally with a solvent and then a fluor to produce photons which are detected by photomultiplier tubes (PMT's) and the associated circuitry. Each sample is housed in a counting chamber between two PMT's during the measurement, and any extraneous light entering the counting chamber will mask the very slight amount of photons produced by the radioactive decay. Therefore, the very faint photons produced by such decay requires a light tight chamber for the sample.

In gamma activity counting, gamma particles produced by gamma emitting isotopes readily pass through a material which would block beta particles. Therefore, the detector alone may be light tight and still measure gamma activity, while the counting chamber housing the sample need not be light tight.

Herein, the liquid samples to be counted are contained in transparent glass or plastic vials which are carried in racks containing 12 or 16 vials each. The number of vials in a rack is an even multiple of the number of counting staitons. Racks containing the vials are loaded onto one side of the deck of the instrument and are advanced, one at a time, across the deck under the counting stations. The rack is advanced step-wise, such that it pauses directly beneath the counting stations for a pre-determined period of time while four of the vials are lifted out of the rack and into the counting chamber. After the beta activity in the first set of vials has been counted for a pre-determined time, the vials are lowered again into the rack. The rack advances one position and the next set of vials is raised, counted, and lowered. This cycle is repeated until all vials in the rack have been counted, at which time the rack is ejected into the post-test storage area as a new rack of vials is positioned automatically under the counters in the first position.

Preferably, opposed pairs of PMT's extend within a massive lead shield defining at least two parallel counting chambers which communicate with each other in a direction generally perpendicular to the common axis of each PMT pair. Test cells are preferably provided with a reflector material on the inner walls thereof in order to reflect and direct 3800–4300 Å photons to the corresponding PMT pair. A light tight means for introducing and removing sample vials is also provided wherein the top of each vial is automatically centered and the vials are controllably supported during measurement.

Because of the particular need to prevent extraneous light from entering the counting chamber in beta activity counting, the invention includes a unique light excluding pressure relief vent (for gravity rods which engage and center the vial tops) and a double iris-type diaphragm closable upon grooves of vial lifting rods which engage the vial bottoms.

For quench counting, an external source of radiation (in a bead) is introduced into the counting chamber after a routine count is performed. By the instant invention, a method and means for transporting such a bead includes a fluid pump communicating simultaneously with a pair of bead transport tubes via a Y connection, with the tubes configured to provide a maxima of curvature in each tube between opposite ends thereof and above the test chamber. With the arrangement disclosed herein, when providing such a quench count to more than two counting chambers, the bead traveling in one tube by fluid pressure will receive increased pressure upon the bead of the other tube reaching its destination. The beads are caused to travel, via positive and negative pressures, between a lead shielded storage container and the lead shielded counting chambers. Of course, if only two counting chambers are provided, then only one such tube having a maxima need be provided. The purpose for the maximas is to ensure complete travel of a bead under gravity, to one side or the other of the maxima, in case of any defect in the transport system. For instance, if the pressure developed by the pump is, for some reason, insufficient to return totally the bead to the storage container, gravity will assist or accomplish such a return once the fluid pressure has caused the bead to clear the maxima of tube curvature. Keeping in mind the importance of the radioactive external source being returned to a massively shielded storage container separate from the shielded counting chambers so as not to affect any counting therein, it may be appreciated the reliablity of instrument performance is enhanced by such a bead transport system.

Hence, by the unique parallel arrangement of counting chambers, a pair of adjacent counting chambers may be provided with a single bead to accomplish quench counting in both chambers simultaneously.

As seen from the above cross-referenced U.S. Pat. Nos. 3,859,528, and 4,035,642, it is known to provide racks for holding rows of sample vials and transporting such sample vials to and from a testing station, wherein the vials to be tested in a particular group of racks are all the same size. By the instant invention, racks of the same length but different widths (for accomodating vials of different diameters) and the associated apparatus for handling the racks, are provided with means for sensing the particular rack at a test station in order to provide the appropriate number of indexing strokes to the rack in accordance with the number of vials therein. For instance, the rack carrying the vials of a larger diameter cannot accommodate as many vials as a rack for the smaller diameter vials. However, by the instant invention, not only may these different racks be intermixed and the indexing steps per rack be adjustable in accordance with sensing of a particular rack, but more racks may be loaded on the horizontal shelf upon which they move, since a rack for carrying the vials of smaller diameter is smaller in width than the rack for carrying vials of a larger diameter. This is a very important point when considering a large volume of samples that must be tested and when considering that, by the instant invention, the various diameter vials may be intermixed according to the racks. The indexing pawl is structured to cooperate with the indexing notches of racks which, while holding different numbers of vials, are equal in length. With each rack having one indexing notch per vial and counting being performed on the vials in sets of four, the 12-vial rack will require three sets of index strokes and the 16-vial rack will require four sets of the strokes.

In order to ensure proper registration of racks of different widths at the transfer station, the invention includes a particular plunger which will accomodate racks of both widths.

In addition to the objects of the invention apparent from the above, other objects will become more readily apparent with reference to the following disclosure.

Several operator-selected programs are incorporated into the memory of the microprocessor-controlled apparatus of the invention. These include two operating programs: Routine Counting and Quench Counting, and three correction programs: Background, Matching with Constant Quench, and Quench Curve Determination. Although described with relation to four side-by-side counting chambers, any multiple of two chambers will apply:

1. Routine Counting—This permits any number of racks of vials to be counted, four vials at a time. Assuming 12 vials to a rack, vials 1, 4, 7 and 10 are counted first. Vials 2, 5, 8, and 11 are counted second and vials 3, 6, 9 and 12 are counted third. The count data are stored into memory and then printed out in numerical order after all 12 vials in a rack have been counted. Assuming 16 vials to a rack, vials 1, 5, 9 and 13 are counted first. Vials 2, 6, 10 and 14 are counted second. Vials 3, 7, 11, and 15 are counted third, and vials 4, 8, 12, and 16 are counted last. Count data are stored and printed out in numerical order as above.

2. Quench Counting—This permits any number of racks of vials to be counted, four vials at a time as for Routine Counting while also providing that, after each set of four vials is counted, two radioactive beads (external standards) are inserted into the detector housing between cells 1 and 2 and between cells 3 and 4 and a second set of counts is recorded and stored for the same set of four vials. After the second set of counts has been recorded, the beads are removed and the first set of vials is lowered into the rack. The rack advances one step and the second set of four vials is raised into the test cell and the same cycle of reading and recording counts is repeated both without and with the radioactive beads in place. All other steps are the same as for Routine Counting.

3. Background—This permits the measuring and recording of background counts for each test cell. These data are stored in memory and may be substracted from the total counts of each cell during Routine Counting or Quench Counting. A special one-hole rack with a single vial containing a blank solution is used as a control. The machine advances the rack such that the vial is raised sequentially into each test cell and counted. Since the vial contains only a blank solution (no radioactive tracer), only background counts are recorded.

4. Matching with Constant Quench—This procedure provides a correction factor to average out the differences between counter stations for use in correcting the printed results during Routine Counting. A special one-hole rack with a single vial containing a solution in which there is a radioactive tracer is used as a control. The machine advances the rack, such that the vial is raised sequentially into each test cell and counted for the same period of time in each cell. Since the activity level is the same for each cell, the counts should be the same, except for random differences from one detector to the next. The numbers of counts for each cell are averaged and a correction factor is calculated for each cell to correct the counts to the average. Those correction factors are stored and are used to correct the counts obtained during a Routine Counting procedure.

5. Quench Curve Determination—This procedure provides a means of relating counting efficiency and external standard counts, permitting an automatic correction in the printed results of Quench Counting. Three or more special one-hole racks, each containing a vial with a radioactive solution of known disintegrations and varying levels of quench, are used to determine a quench curve. The machine advances each rack in succession, such that the vials are raised sequentially into each test cell and counted for a selected period of time, both without and with an external standard in place as described under Quench Counting. A quench curve is determined for each detector. These data are then stored in memory and may be used to correct the printed results during Quench Counting with unknown samples.

Instead of the special one-hole racks described in the three correction programs, it has been found that the 12-vial rack may be used with the single vial placed in the seventh hole thereof.

BRIEF DESCRIPTION OF THE DRAWINGS

FIGS. 8–10, respectively, are top, side, and bottom views of a 12-vial rack of the invention.

DETAILED DESCRIPTION OF THE INVENTION

Figure 1:
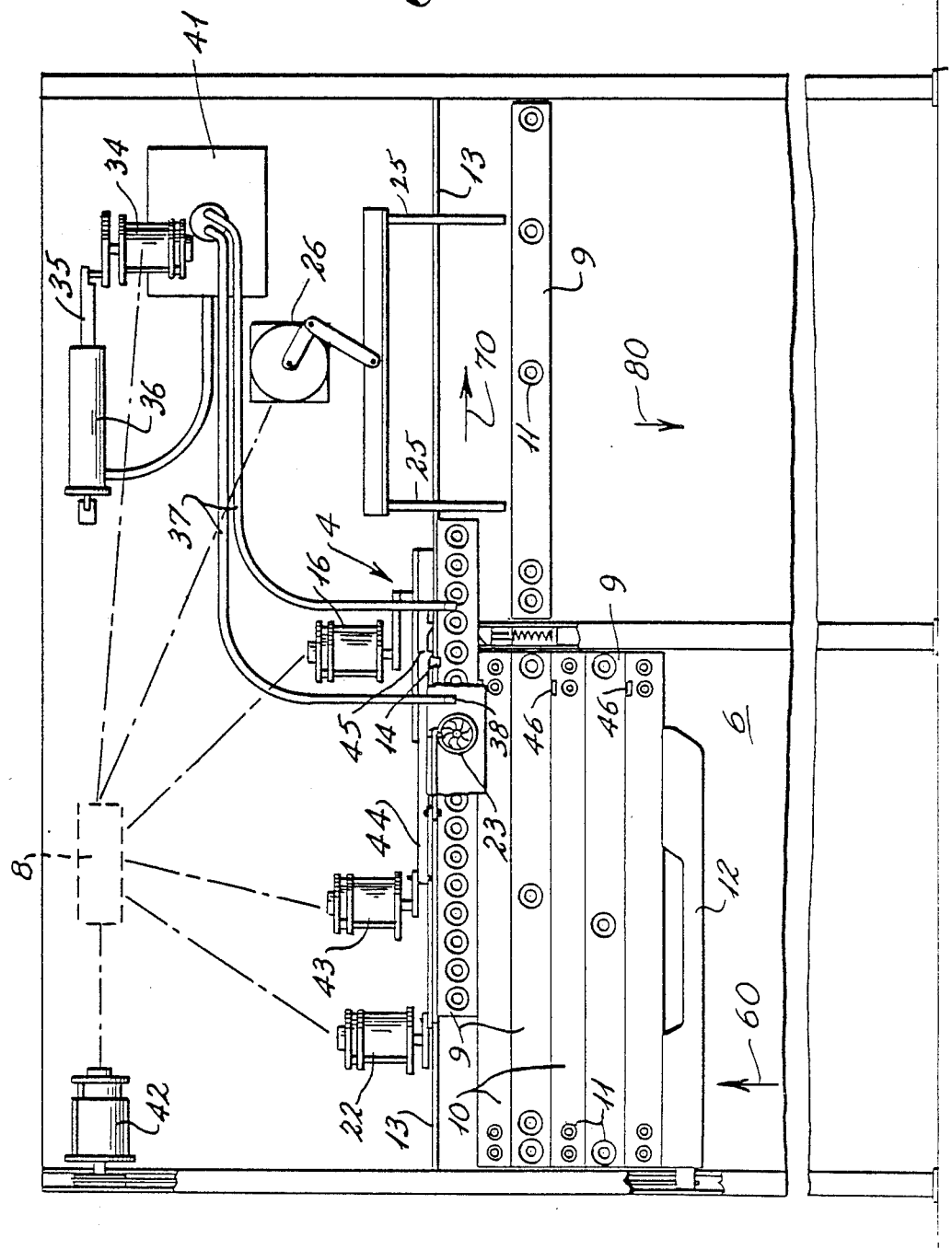
FIG. 1 is a top plan schematic view of the rack handling apparatus of the instant invention.
Figure 2:
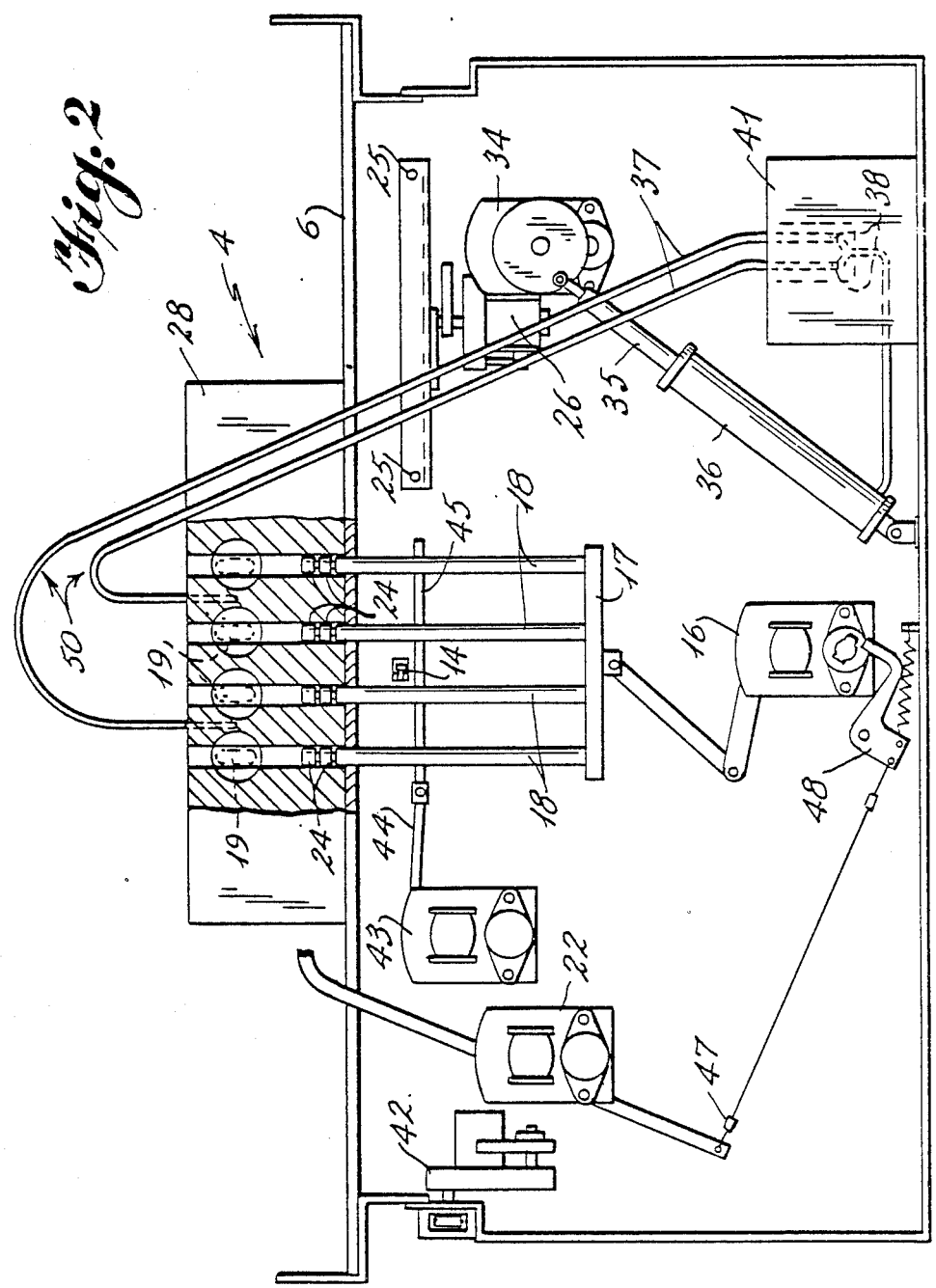
FIG. 2 is a cross-sectional schematic view of the device of FIG. 1.

Referring to FIGS. 1–4, a horizontally disposed shelf 6 slidably supports a plurality of racks for subsequent feeding in the directions of arrows 60, 70 and 80 as seen in FIG. 1. The number of vials that each rack can hold is a multiple of the number of counting chambers available at test station 4. For instance, racks 9 accommodate 12 vials and racks 10 accommodate 16 vials, since test station 4 has four intercommunicating test chambers.

Feed of racks 9, 10 in the direction of arrows 60 is provided by a pressure arm 12 which is advanced by a rack feed motor 42 such that the rack in the forward-most position abuts against a rail 13. Mounted in rail 13 is a switch 14 for detecting the presence of a rack against rail 13 in order that an indexing motor 43 may be activated to step the rack in the direction of arrows 70. This stepping is provided by operation of a drive linkage 44 and spring loaded pall 45 engageable with an indexing notches 3 in the racks. Switch 14 also serves the purpose of determining whether the rack being presented to the test station contains 12 or 16 vials by feeling for a notch 46 in the 16-vial rack 10. Depending upon which rack is sensed, indexing motor 43 advances the rack the appropriate number of steps such that the first vial is directly below the first detector 19.

Figure 3:
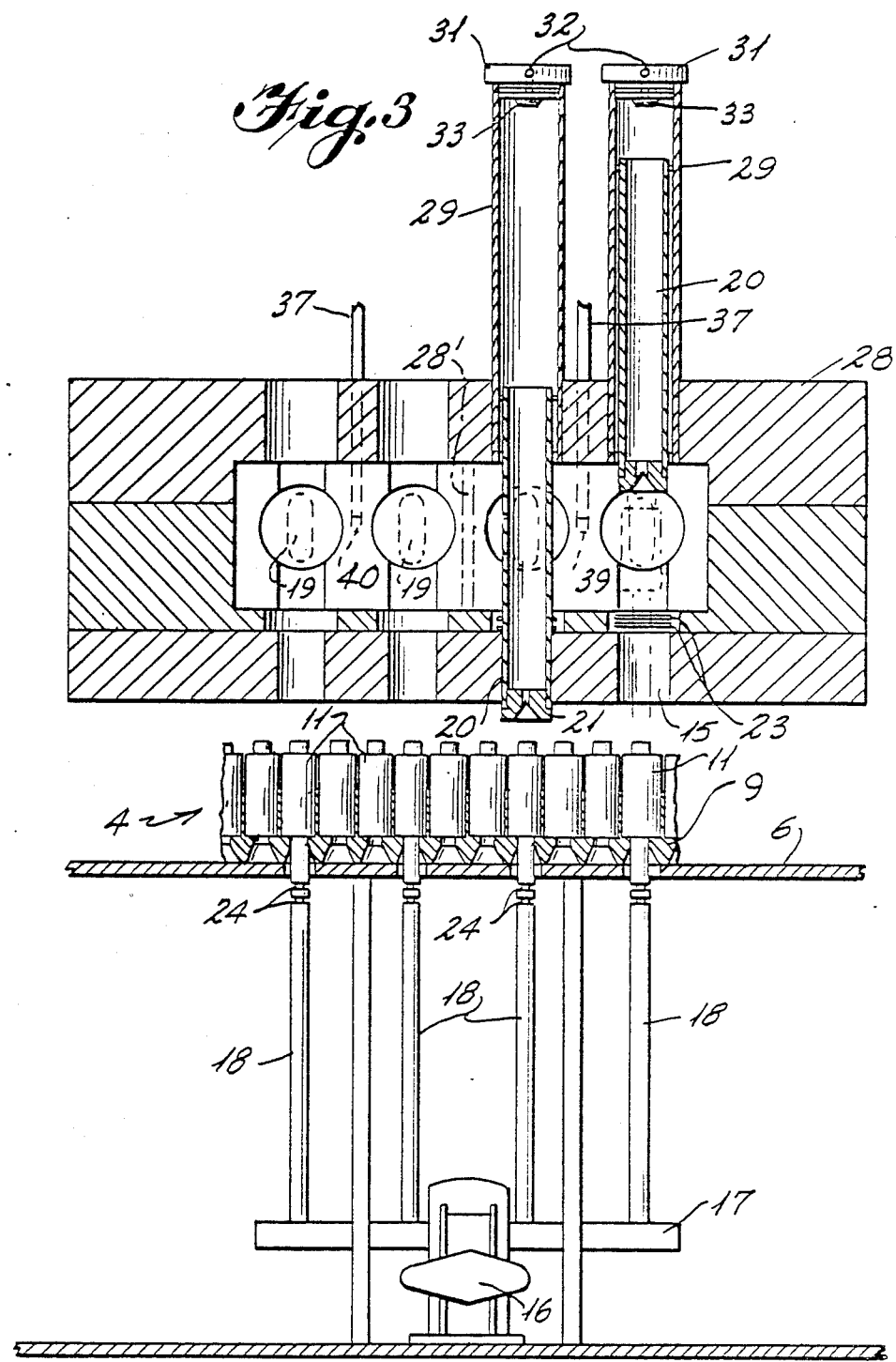
FIG. 3 is a cross-sectional view through a lead shielded counting chamber and including the means for raising samples into the counting chamber and lowering them therefrom.
Figure 4:
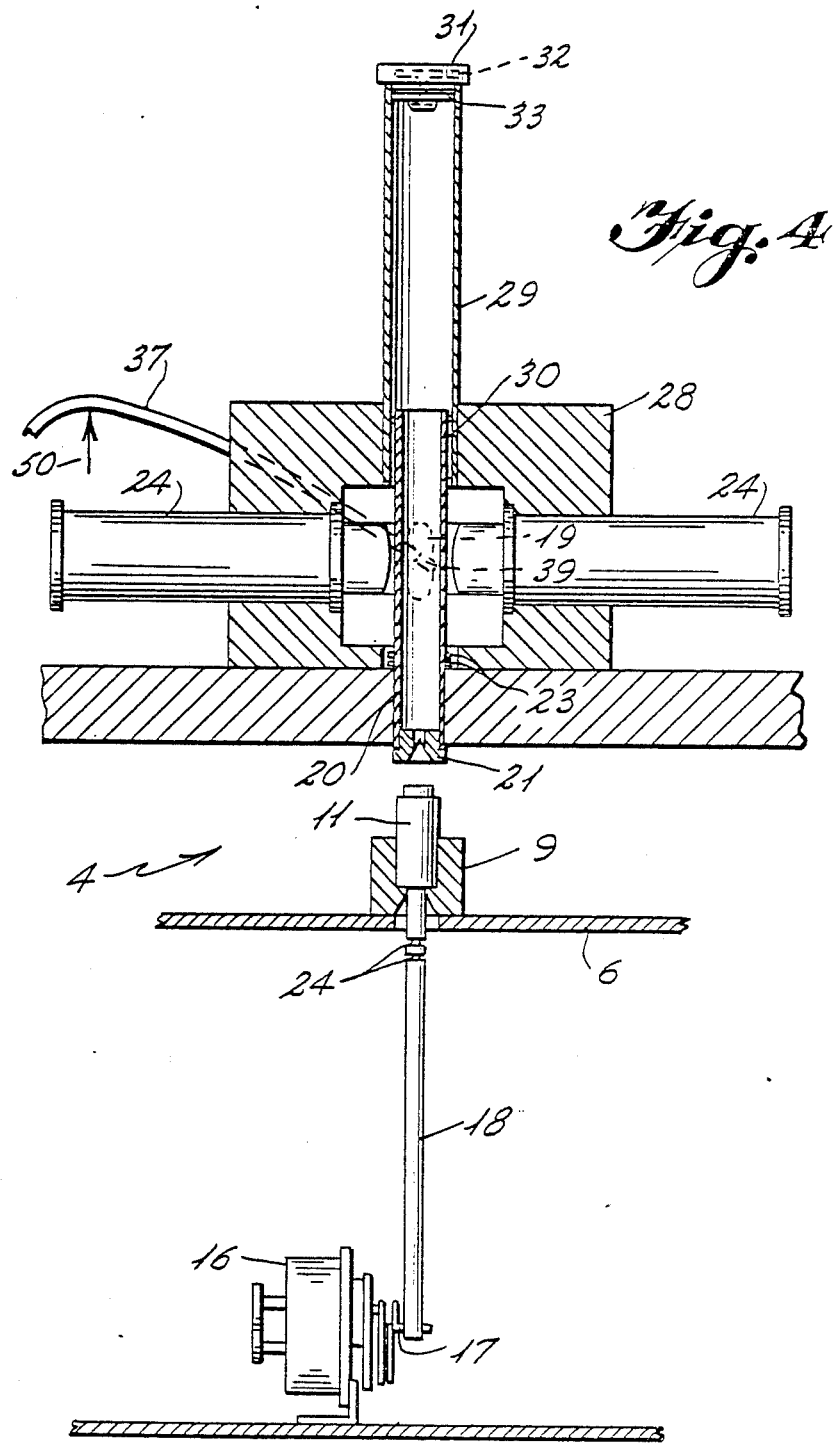
FIG. 4 is left side cross-sectional view of the device of FIG. 3.
Figure 5:
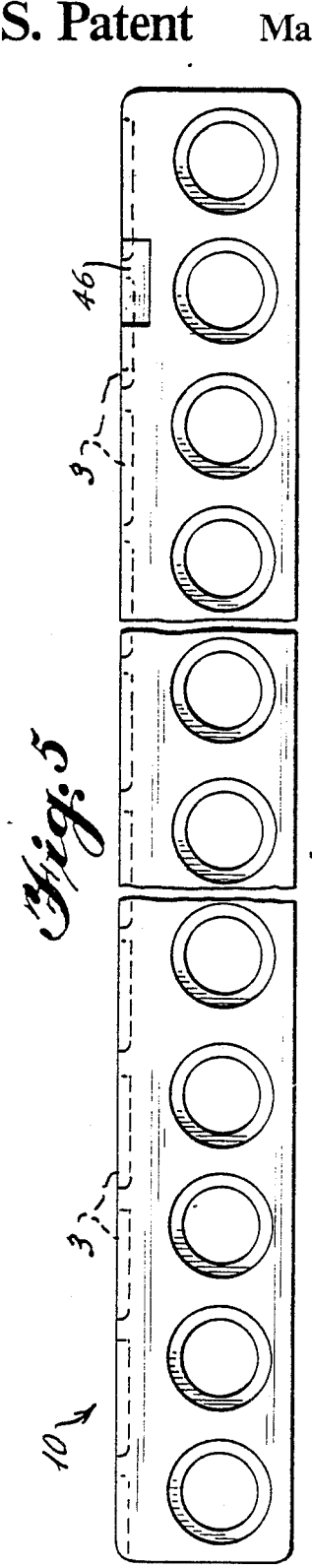
FIGS. 5–7, respectively, are top, side, and bottom views of a 16-vial rack of the instant invention.
Figure 6:
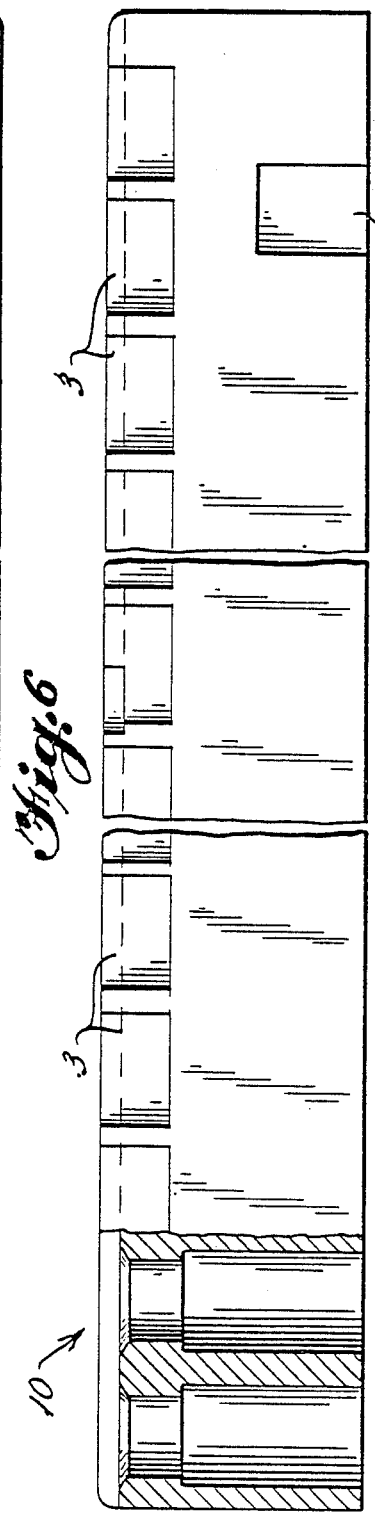
Figure 7:
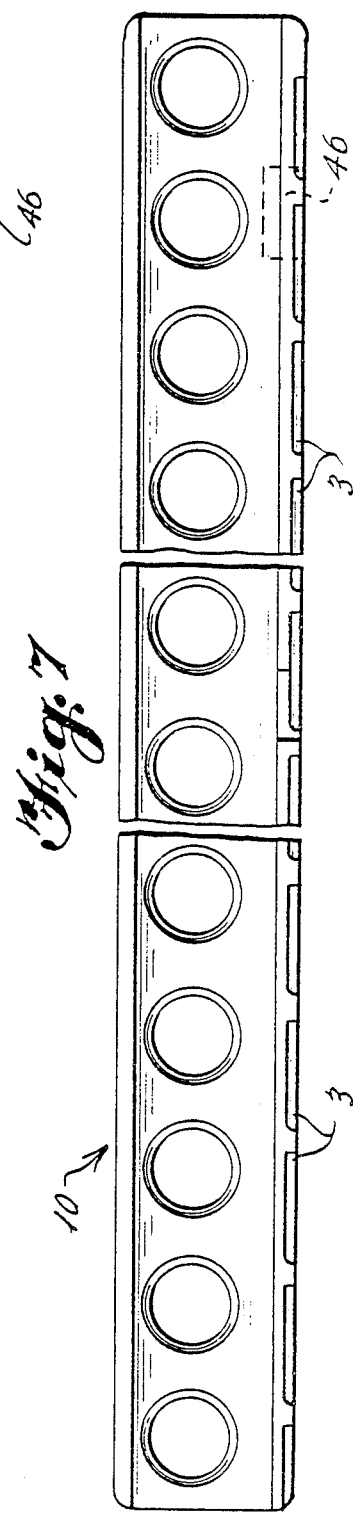
Figure 11:
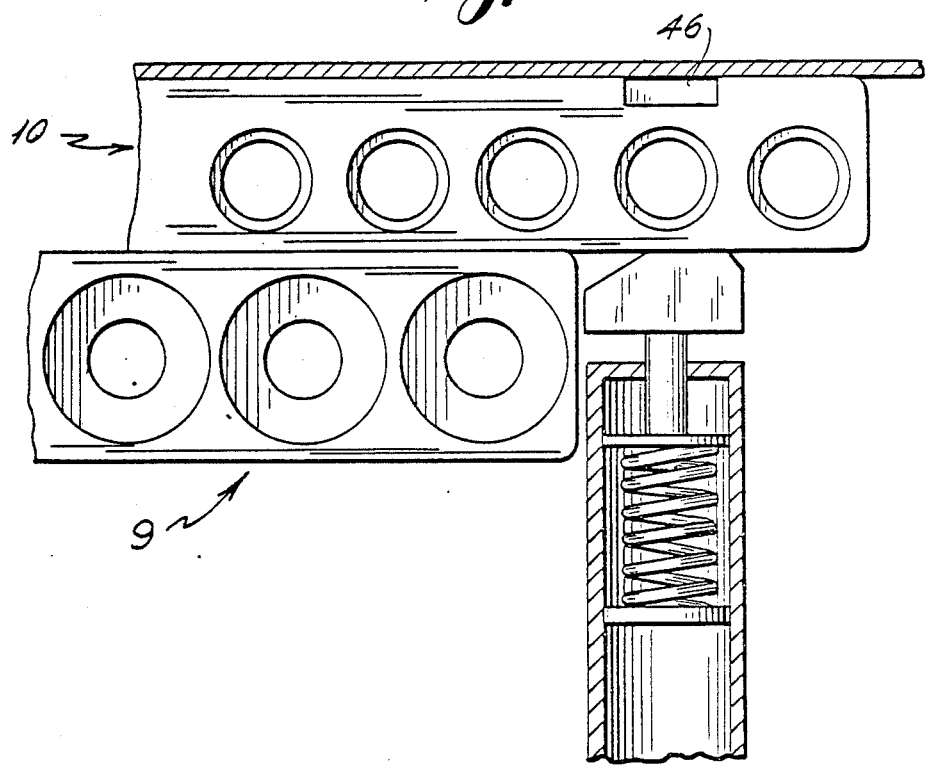
FIG. 11 is an enlarged partial view illustrating a plunger adaptable to racks of different widths in order to hold the racks in registration for transfer to and from the test station.

A lift assembly comprises a lift motor 16 for providing the raising and lowering of four lift rods 18. As seen in FIG. 3, vial Nos. 1, 4, 7 and 10 are engaged by lift rods 18 to raise them out of the rack and into detector cells 19. As the vials are lifted, each one contacts a guided weight rod 20 which has a conical cavity 21 at the lower end thereof for centering the vial as it is raised. Upon each vial reaching its uppermost position, motor 16 stops and motor 22 activates a pair of iris diaphrams 23 to close around two adjacent necked-down areas 51 in each lift rod 18, thus blocking any stray light from entering the counting chambers from below. As motor 22 starts to close the iris diaphrams 23, a cable linkage 47 applies a spring-loaded brake 48 to lift motor 16 in order to prevent lift rods 18 from moving while the iris diaphrams 23 are closed. After diaphrams 23 are closed, a high voltage to photomuliplier tubes 24 is turned on and counting is started. After a pre-determined counting period, the high voltage is switched off, the iris diaphrams 23 are opened releasing brake 48 on lift motor 16, and the vials are lowered back into their rack.

Thereafter, the rack advances one step and the cycle is repeated as above, lifting and counting vials 2, 5, 8, and 11. After these vials are lowered, the rack advances one step and the cycle is repeated, lifting and counting vials 3, 6, 9 and 12, thus completing all vials in the 12-vial rack. The rack is then advanced a pre-programed number of steps until it clears the area for the next rack to advance into engagement with rail 13 during actuation of Motor 42. A motor 26 drives eject rods 25 to engage and move a rack (which has just cleared the test station) away from back rail 13 and into a post-test storage area 27 of shelf 6. The entire process is repeated for the next rack of vials, according to the rack size.

To obtain reliable and accurate counting results, the photomultiplier tubes 24 and the sample under test must be effectively shielded from outside sources of light and radiation during the counting period. Test cell 19 consists of two diametrically opposed photomultiplier tubes 24 shielded all around with removable radiation shields 28 to minimize the effects of background radiation. A capped hollow guide tube 29 is located directly above each test cell and contains a sleeve bearing 30 within which a weight rod 20 is telescopic during lifting and lowering of the vials. A sealed cap 31 on the top of each guide tube 29 has a transverse vent hole 32 to prevent pressure buildup in the guide tube 29 during retraction of weight rod 20. Vent hole 32 is baffled to prevent light from entering guide tube 29 by the installation of a porous sintered metal plug 33 in the bottom of cap 31 in communication with venthole 32. By use of a discriminator circuit associated with the photomultiplier tubes, only those scintillations seen by a pair of tubes 24 at the same time are counted. Any pulses which affect only one of the tubes at a time are ignored.

Figure 12:
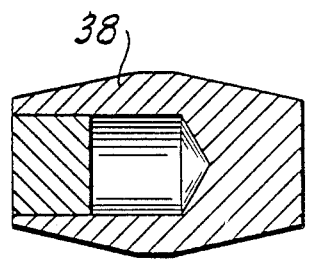

When performing a quench counting operation, as described earlier, additional steps are required. After each set of vials has been counted, a pump drive motor 34 is operated for one-half revolution causing piston 35 to be pushed into cylinder 36 such that air is forced into two small tubes 37, each containing a bead 38 housing radioactive material to be used as an external source. As seen from FIG. 12, bead 38 is hollowed out at one end for reception of a radioactive material and a plug (not shown) is used to close that end of bead 38. The forced air causes movement of a bead 38 to the far end of each conduit 37 which terminates inside radiation shield 28 directly between two adjacent test cells at 39, 40 (FIG. 3).

Tubes 37 are designed to ensure that the radioactive bead reaches its end-most position in both directions, i.e., assures that beads 38 are totally enclosed within lead shielding at their opposite ends of travel in tubes 37. If one bead reaches its test position first, the air flow in that tube is constricted causing an increase in pressure in the other tube, thus aiding the other bead 38 in travel to its test position. In addition, once a bead 38 passes the maxima 50 of curvature of a tube 37, gravity will cause the bead 38 to seat properly in the test position even if dust or fluid or an air flow problem arises in the tube. As bead 38 is drawn back to its stored position in shielded block 41 and again passes a maxima 50, gravity will aid return of the bead to the stored position. The beta counter is pre-programmed to record the number of counts from the vials both before and after bead 38 is used as an external source. Upon completion of the quench count, the vials are lowered into the rack and the cycle continues as described above.

A controller 8, such as a microprocessor is utilized to coordinate operation of the various switches, motors and the like.

It is contemplated that, in some instances and when using some counting methods, lead shielding may be provided between the second and third test cells as illustrated in phantom lines in FIG. 3.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween:

We claim:

1. In a scintillation counting method utilizing an external radioactive source which is introduceable into and removable from a counting chamber in order to accomplish auxillary counting procedures such as quench counting, the improvement comprising the steps of:
   providing at least a pair of parallel, side-by-side counting chambers: and
   conducting plural simultaneous auxillary counts while utilizing a single external source per pair of counting chambers.

2. In an apparatus for performing a scintillation counting method utilizing an external radioactive source which is introduceable into and removable from a counting chamber in order to accomplish auxillary counting procedures such as quench counting, the improvement comprising:
   means for providing at least a pair of parallel, side-by-side counting chambers; and
   means for handling a single external source per pair of said counting chambers in order to conduct plural auxillary counts simultaneously.

3. An improvement as in claim 2, wherein said external source handling means comprises:
   a transport means for guiding one or more bead carrying each said external source, said transport means being provided with a maxima of curvature between two extremes of travel of each bead, such that each bead is gravity assistable in travel of said bead to said extremes.

4. An improvement as in claim 3 wherein said transport means comprises a tube in which said bead is transported, and further comprising:
   at least another pair of parallel, side-by-side counting chambers and corresponding transport tube; and
   means interconnecting said tubes with a source of fluid under pressure to propel a bead in each tube such that upon a bead reaching an extreme in one tube, pressure increases in at least one remaining tube to assist transport of a bead in said remaining tube.

5. In a beta activity counter having a chamber into which a sample is lifted against the gravitational opposition of a gravity rod which retracts and telescopes into a tubular enclosure for said rod upon lifting of said sample, the improvement comprising;
   a vent means for relieving pressure in said tubular enclosure during retracting of said gravity rod while preventing external light from entering said chamber via said tubular enclosure.

6. The improvement of claim 5, wherein said vent means comprises:
   a cap for said tubular enclosure, said cap having a vent hole with an axis generally perpendicular to an axis of said tubular enclosure; and
   a porous plug of sintered material between said vent hole and said tubular enclosure.

* * * * *